(12) United States Patent
Strong

(10) Patent No.: US 11,341,209 B2
(45) Date of Patent: *May 24, 2022

(54) METHOD OF DESIGNING A CUSTOMIZABLE WEBSITE

(71) Applicant: SMUGMUG, INC., Mountain View, CA (US)

(72) Inventor: Brian Strong, San Jose, CA (US)

(73) Assignee: Awes.me, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/229,558

(22) Filed: Apr. 13, 2021

(65) Prior Publication Data

US 2021/0303656 A1    Sep. 30, 2021

Related U.S. Application Data

(63) Continuation of application No. 14/199,712, filed on Mar. 6, 2014, now Pat. No. 10,977,426.

(60) Provisional application No. 61/774,360, filed on Mar. 7, 2013.

(51) Int. Cl.
| | |
|---|---|
| *G06F 40/00* | (2020.01) |
| *G06F 16/958* | (2019.01) |
| *G06F 40/14* | (2020.01) |
| *G06F 40/186* | (2020.01) |

(52) U.S. Cl.
CPC ............ *G06F 16/986* (2019.01); *G06F 40/14* (2020.01); *G06F 40/186* (2020.01)

(58) Field of Classification Search
CPC .. G06F 17/248; G06F 17/3089; G06F 16/986; G06F 40/186; G06F 40/14
See application file for complete search history.

(56) References Cited

U.S. PATENT DOCUMENTS

| | | | |
|---|---|---|---|
| 7,383,499 B2 * | 6/2008 | Kraft ..................... | G06F 40/186 |
| | | | 715/246 |
| 10,185,703 B2 * | 1/2019 | Abrahami ............. | G06F 40/103 |
| 10,977,426 B2 | 4/2021 | Strong | |
| 2003/0014442 A1 | 1/2003 | Shiigi et al. | |
| 2003/0225853 A1 | 1/2003 | Wang et al. | |
| 2008/0109472 A1 | 5/2008 | Underwood et al. | |
| 2012/0072436 A1 | 3/2012 | Pierre et al. | |
| 2012/0131442 A1 | 5/2012 | Grizim et al. | |

(Continued)

FOREIGN PATENT DOCUMENTS

WO    WO 2012/057726    5/2012

OTHER PUBLICATIONS

U.S. Appl. No. 14/199,712 Final Office Action dated Nov. 16, 2018.

(Continued)

*Primary Examiner* — Scott T Baderman
*Assistant Examiner* — Barbara M Level
(74) *Attorney, Agent, or Firm* — Polsinelli LLP

(57) ABSTRACT

Embodiments described herein relate to designing a customizable website by using a custom design application. The custom design application generally provides a site master template, a homepage template, a plurality of sub templates, and a 404 error template. The templates may be customized with input provided by a user. The method also provides a manner of customizing a website by utilizing a hierarchical relationship between the templates in order to easily and efficiently custom design a website.

21 Claims, 7 Drawing Sheets

(56) References Cited

U.S. PATENT DOCUMENTS

2013/0254655 A1     9/2013   Nykyforov
2014/0122649 A1     5/2014   Calvin et al.

OTHER PUBLICATIONS

U.S. Appl. No. 14/199,712 Non-Final Office Action dated May 24, 2018.
U.S. Appl. No. 14/199,712 Final Office Action dated Dec. 5, 2017.
U.S. Appl. No. 14/199,712 Non-Final Office Action dated Jun. 2, 2017.
U.S. Appl. No. 14/199,712 Final Office Action dated Nov. 22, 2016.
U.S. Appl. No. 14/199,712 Non-Final Office Action dated Apr. 25, 2016.

\* cited by examiner

METHOD OF DESIGNING A CUSTOMIZABLE WEBSITE

CROSS-REFERENCE TO RELATED APPLICATIONS

This application is a continuation and claims the priority benefit of U.S. patent application Ser. No. 14/199,712 filed Mar. 6, 2014, now U.S. Pat. No. 10,977,426, which claims the priority benefit of U.S. provisional patent application 61/774,360 filed Mar. 7, 2013, which are hereby incorporated by reference.

BACKGROUND

1. Field

Embodiments described herein generally relate to a method for designing a website. More specifically, the embodiments relate to a method of designing a customizable website.

2. Description of the Related Art

The Internet has gained prevalence in today's society enjoyed by few other technologies. The backbone of the Internet is the almost countless number of websites that can be accessed from the Internet by users around the world. Many users maintain a website for business or personal use. However, creating a website generally requires the knowledge of computer code such as HTML, Java, Javascript, C, C++, Perl, PHP, Ruby, SQL, etc. Many users lack the requisite knowledge required to design a functioning website using code in a cost effective and timely manner. Moreover, the evolution of websites has resulted in a demand from website viewers that the websites function properly and are aesthetically pleasing.

Generally, a user must hire a website designer or engineer with knowledge of computer code to construct and build a website to their desired specifications. Although the web designer or engineer may create a website that meets the specifications of the user, any subsequent changes required by the user would require further revision by the website designer or engineer. Each time the user wants to make any changes to the website, they must pay for the changes which can decrease the cost-effectiveness of owning and maintaining a website. Further, for a user who updates or changes their website frequently, it would be difficult to maintain a website with current information if the user was not able to change and update the website themselves.

Moreover, a user may maintain a website that has multiple web pages within the website. Some websites may have dozens or even hundreds of web pages. Individually editing and designing each web page can be a costly and time consuming process. Individual editing of web pages within a website may also result in unintended differences between related pages within a website which would reduce the aesthetic appeal of the website to a viewer.

Therefore, what is needed in the art is a customizable website design application which requires no knowledge of computer code to alter the website design and associated web pages in a timely manner and results in an aesthetically pleasing and functioning website.

SUMMARY

In one embodiment, a method of designing a customizable website begins by providing a customizable website from a server having a plurality of web page templates adhering to a hierarchical relationship. A site master template may be provided as an example of one of the plurality of web page templates. The site master template is customizable with input received from a user and the site master template is the most superior web page template in the hierarchical relationship. A homepage template is also provided as an example of one of the plurality of web page templates. The homepage template is customizable with input received from the user and is inferior to the site master template in the hierarchical relationship. Further, a plurality of sub-templates are provided as an example of one of the plurality of web page templates. The plurality of sub-templates are customizable with input received from the user and the plurality of sub-templates are inferior to the site master template in the hierarchical relationship. Finally, localized input is received from the user customizing the plurality of web page templates in a manner not subject to the hierarchical relationship.

In another embodiment, a computer readable storage medium is provided. The computer readable storage medium stores instructions that, when executed by a processor, cause the processor to design a customizable website by performing various steps. A customizable website is provided from a server comprising a plurality of web page templates adhering to a hierarchical relationship. The providing a customizable website further comprises providing a site mater template. The site master template may be customizable with input received from a user and the site master template may be the most superior web page template in the hierarchical relationship. A homepage template is also provided. The homepage template is customizable with input received from the user and may be inferior to the site master template in the hierarchical relationship. A plurality of sub-templates are also provided. The plurality of sub-templates are customizable with input received from the user and the plurality of sub-templates may be inferior to the site master template in the hierarchical relationship. Additionally, localized input may be received by the user to customize the plurality of web page templates in a manner not subject to the hierarchical relationship.

In yet another embodiment, a computer system for designing a customizable website is provided. The computer system comprises a processor and a memory. The memory stores instructions that, when executed by the processor, cause the computer system to provide a customizable website from a server. The customizable website comprises a plurality of web page templates adhering to a hierarchical relationship. The computer system provides a site master template. The site master template are customizable with input received from a user and the site master template may be the most superior web page template in the hierarchical relationship. A home page template is also provided. The homepage template is customizable with input received from the user and may be inferior to the site master template in the hierarchical relationship. A plurality of sub-templates may also be provided. The plurality of sub-templates are customizable with input received from the user and the plurality of sub-templates may be inferior to the site master template in the hierarchical relationship. Localized input may also be received from the user to customize the plurality of web page templates in a manner not subject to the hierarchical relationship.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized in other embodiments without specific recitation.

DETAILED DESCRIPTION

Embodiments described herein allow a user to design a customizable website by using a custom design application. The custom design application generally provides a site master template, a homepage template, a plurality of sub templates, and a 404 error template. The templates may be customized with input provided by a user. The methods also provide a manner of customizing a website by utilizing a hierarchical relationship between the templates in order to easily and efficiently custom design a website.

Figure 1:
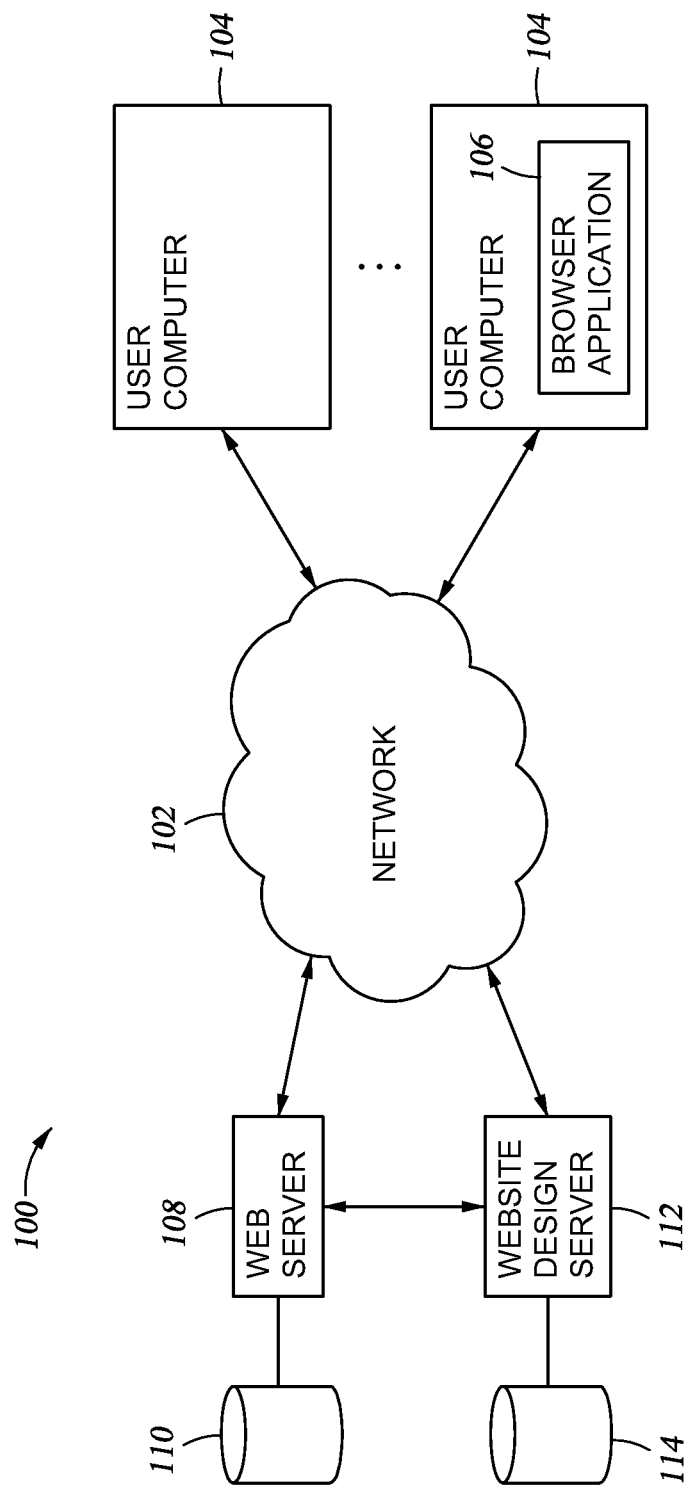
FIG. 1 illustrates a computer system configured for receiving input to design a customizable website, according to certain embodiments described herein.

FIG. 1 illustrates a computer system configured for receiving input to design a customizable website, according to certain embodiments of the present invention. As shown, the computing system 100 includes a web server 108, a website design server 112, and a plurality of user computers 104 (only two of which are shown for clarity), each connected to a communications network 102 (e.g. the Internet). For example, the web server 108 may be programmed to communicate with the user computers 104 and the website design server 112 using a networking protocol such as TCP/IP protocol. In another embodiment, the website design server 112 may communicate directly with the user computers 104 through the communications network 102.

Each user computer 104 may include conventional components of a computing device, e.g., a processor, system memory, a hard disk drive, input devices such as a mouse and a keyboard, and/or output devices such as a monitor, and/or a combination input/output device such as a touchscreen which not only receives input but also displays an output. The web server 108 and the website design server 112 include a processor and a system memory (not shown), and may be configured to manage web pages and other media content stored in its respective content storage unit 110 and 114 using a file system and/or relational database software. The website design server 112 is a web server configured to manage website design applications, such as a website builder and customizable web page templates, and content stored in the website design server 112 content storage unit 114. In one embodiment, the website design server 112 may be configured to receive input from a user and enable the user to design a customizable website utilizing techniques described herein and is described in further detail below.

In the embodiments described below, users are respectively operating the user computers 104 that may communicate over the network 102 to request web pages and other media content data from the website design server 112. Each user computer 104 may be configured to execute a software application, such as a browser application 106, and access web pages and/or media content data managed by the website design server 112 by specifying a uniform resource locator (URL) for the website design server 112 into the web browser application 106. The web pages that are displayed to a user are transmitted from the website design server 112 to the user's computer 104 and processed by the web browser application 106 for display through a monitor of the user's computer 104.

In one embodiment, a web page displayed to the user on the user's computer 104 is the user's own website. The user's computer 104 accesses the website design server 112 which, in turn, retrieves the user's website from storage 114, and causes the user's website to be shown through the browser 106 on the user's computer 104. The user's website may be managed by the user with a username and password combination, or other similar restricted access/verification required access methods, which allow the user to "log in" and make changes within the design of the website. Changes or alterations in the design made by the user to their website on the user computer 104 are transmitted through the communications network 102 to the website design server 112. The website design server 112 transfers the user's website to storage 114 where it may be retrieved and viewed by any other users with access to the Internet.

It is noted that the user computer 104 may be a personal computer, laptop, mobile computing device, smart phone, tablet, video game console, home digital media player, network-connected television, set top box, and/or other computing devices having components suitable for communicating with the communications network 102. The user computer 104 may also execute other software applications configured to receive website design content from the website building server 112, such as, but not limited to, media display software, media players, computer and video games, and/or widget platforms.

Figure 2:
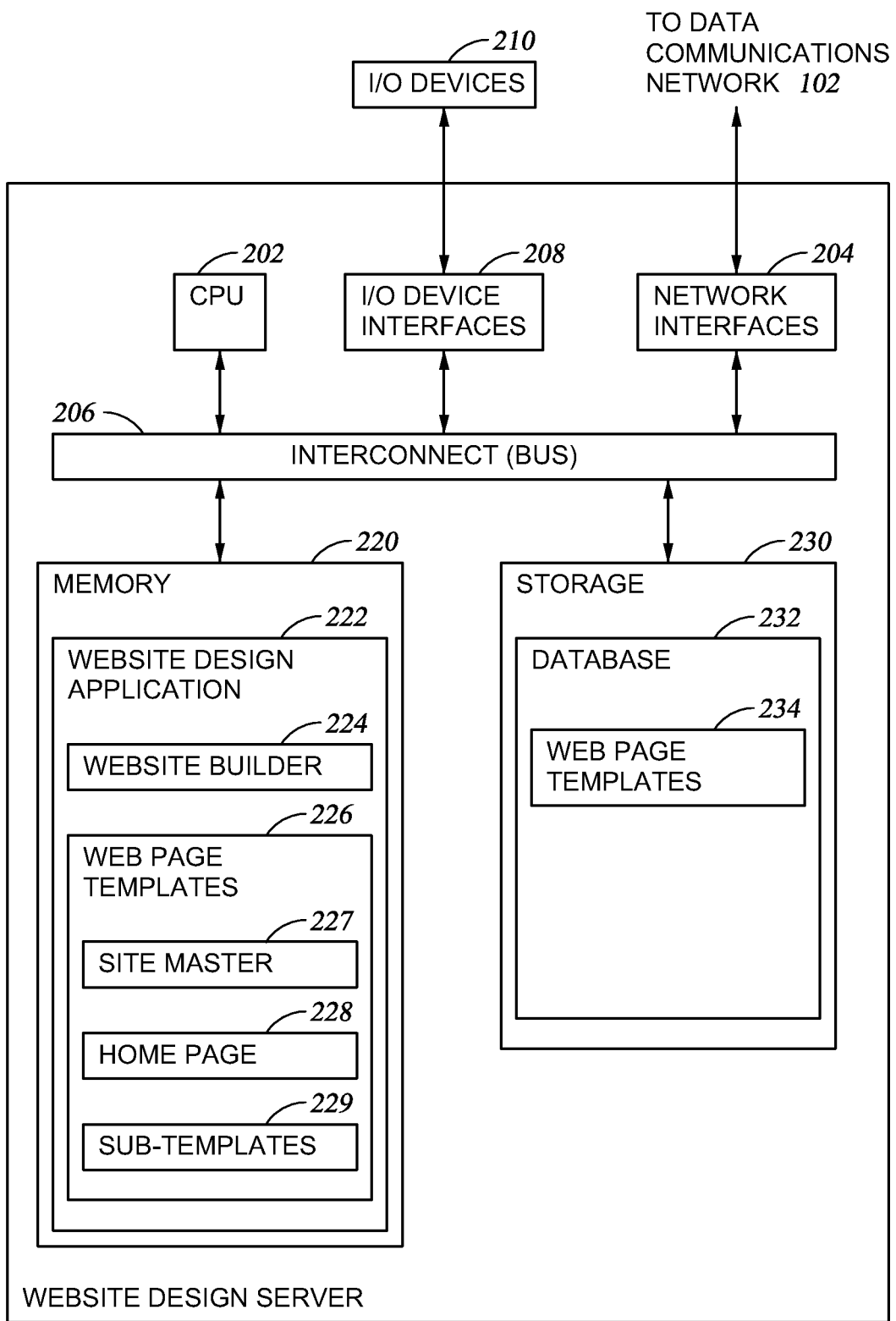
FIG. 2 illustrates a more detailed view of a website design server of FIG. 1 within which embodiments described herein may be implemented.

FIG. 2 illustrates a more detailed view of a website design server of FIG. 1 within which embodiments may be implemented. As shown, the website design server 112 includes, without limitation, a central processing unit (CPU) 202, a network interface 204, memory 220, and storage 230 communicating via an interconnect bus 206. The website design server 112 may also include I/O device interfaces 208 connecting I/O devices 210 (e.g. keyboard, video, mouse, audio, touchscreen, etc). The website design server 112 may further include a network interface 204 configured to transmit data via the communications network 102.

The CPU 202 retrieves and executes programming instruction stored in the memory 220 and generally controls and coordinates operations of other system components. Similarly, the CPU 202 stores and retrieves application data residing in the memory 220. The CPU 202 is included to be representative of a single CPU, multiple CPU's, a single CPU having multiple processing cores, and the like. The interconnect 206 is used to transmit programming instructions and application data between the CPU 202, I/O device interfaces 208, storage 230, network interface 204, and memory 220.

The memory 220 is generally included to be representative of a random access memory and, in operation, stores software applications and data for use by the CPU 202. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), or a storage area-network (SAN) configured to store non-volatile data.

According to one embodiment, the memory 220 stores instruction and logic for executing a website design application 222. The website design application 222 includes a website builder 224 and multiple web page templates 226, such as a site master template 227, homepage template 228, and sub-templates 229. The storage 230 stores website design content and includes a database 232 configured to store data for designing a website according to techniques described herein, such as a plurality of web page templates 234. The database 232 also stores data relating to previously created websites by the user which may be easily accessed by the user when the user is editing their website. In one embodiment, the database 232 can be any type of storage device.

Figure 3:
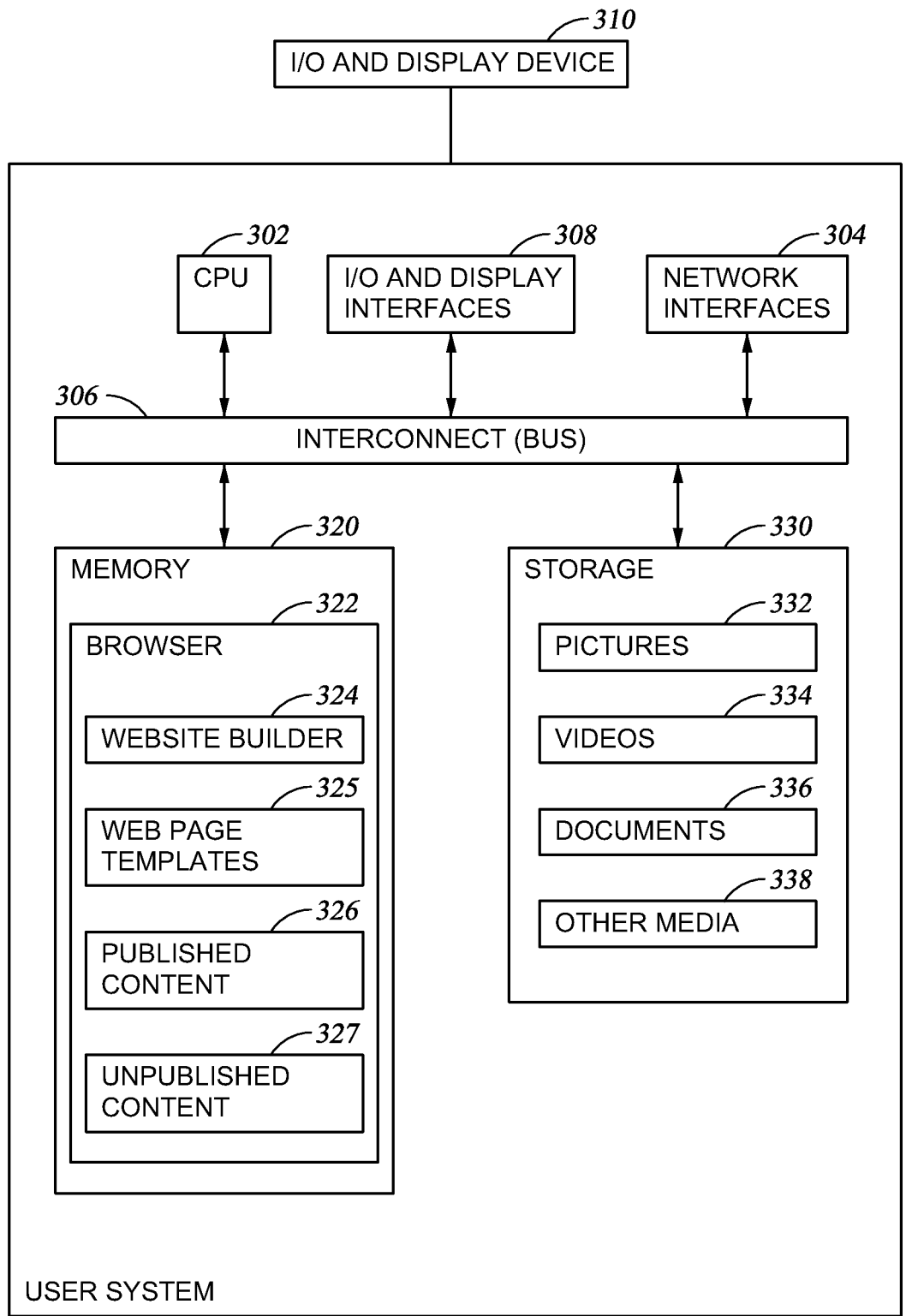
FIG. 3 illustrates a user computing system used to access the website design server and design a website according to certain embodiments described herein.

FIG. 3 illustrates a user computing system used to access the website design server and design a website, according to certain embodiments. As shown, the user computing system 104 includes, without limitation, a central processing unit (CPU) 302, a network interface 304, an interconnect 306, a memory 320, and storage 330. The computing system 104 may also include an I/O device interface 308 connecting I/O devices 310 (e.g. keyboard, display, touchscreen, and mouse devices) to the computing system 104.

Like CPU 202, CPU 302 is included to be representative of a single CPU, multiple CPU's, a single CPU having multiple processing cores, etc., and the memory 320 is generally included to be representative of a random access memory. The interconnect 306 is used to transmit programming instructions and application data between the CPU 302, I/O device interfaces 308, storage 330, network interface 304, and memory 320. The network interface 304 is configured to transmit data via the communications network 102, e.g. to stream content from the website design server 112, as well as to receive and present the user's website in a published or editable format from the website design server 112. Storage 330 such as a hard disk drive or solid-state storage drive (SSD), may store non-volatile data. In one embodiment, the storage 330 contains pictures 332, videos 334, documents 336, and other media 338 which can be any type of media that may be published to a website. Illustratively, the memory 320 includes a web browser 322, which itself displays a website builder 324, web page templates 325, published content 326, and in certain embodiments, unpublished content 327. The browser 322 provides a software application which allows the user to access web pages and other content hosted by the website design server 112. The browser 322 may also allow any user of the user computer system 104 to access any website available on the Internet.

Figure 4A:
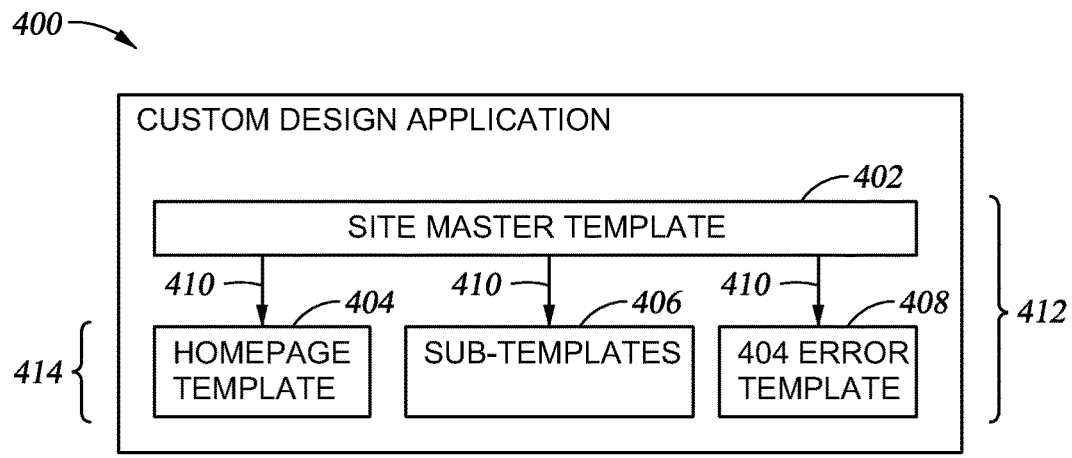
FIG. 4A illustrates a custom design application with exemplary templates and their interrelation to one another according to certain embodiments described herein.

FIG. 4A illustrates a custom design application with exemplary templates and their interrelation to one another according to certain embodiments. The custom design application 400 generally comprises a plurality of templates 412, such as a site master template 402, a homepage template 404, one or more sub-templates 406, and a 404 error template 408. The custom design application 400 and plurality of templates 412 are provided by the website design server 112 through the communications network 102 to the user computer system 104 as previously described. The custom design application 400 and plurality of templates 412 are displayed via an I/O device through the browser which allows the user to interact with the custom design application 400 and plurality of templates 412 to create a customizable website design. It should be noted that a website created by a user utilizing the custom design application 400 may have a single web page or multiple web pages within the website.

The website may be customized by providing input and selections to the custom design application 400 and the plurality of templates 412 to create a customized website design. Generally, the input or selections will determine what content will be displayed in the user's website. For example, a cursor (not shown) may be moved across an I/O display device upon which the custom design application 400 and plurality of templates 412 are shown. The cursor may be moved by the user with a traditional I/O device such as a mouse or a trackpad and the cursor is adapted to indicate the user's input or selection within the custom design application 400. A user's tactile input, such as a user's finger, contacting a touch enabled device may also be used to provide input to the custom design application 400.

The site master template 402 provided in the custom design application 400 is representative of a template that allows a user to easily and efficiently design a website that incorporates a common design scheme throughout every web page of the website. The site master template 402 is generally a template for applying a design to a website and is not representative of a web page that may be accessed by a viewer of the user's website. The site master template 402 allows the user to provide a global content effect throughout the user's customized website. The global content effect is an input provided to the site master template 402 which causes the input content to be displayed on every web page within the user's customized website. A hierarchy among the plurality of templates 412 enables the global content effect to be applied in an efficient and easy to use manner. A simplified schematic of the hierarchy is shown by the hierarchical relationship 410 between the plurality of templates 412. As shown, the site master template 402 is superior to inferior templates 414 in the hierarchy, such as the homepage template 404, sub-templates 406, and 404 error template 408.

In one embodiment, an input provided to the site master template 402 will adhere to the hierarchical relationship 410 and result in a global content effect which will cause the single input provided to the site master template 402 to display the input content on inferior templates 414 in the hierarchical relationship 410, such as the homepage template 404, sub-templates 406, and 404 error template 408. In another embodiment, the user may select which inferior templates 414 will adhere to the hierarchical relationship 410 and display content provided to the site master template 402 via user input. In certain embodiments, the user may provide one or more inputs to the site master template 402 which will result in global content effects to be displayed on every inferior template 414 in the hierarchical relationship 410.

In another embodiment, the user may provide no input to the site master template 402. In this embodiment, inferior templates 414 in the hierarchical relationship 410 will not display any global content effect because the site master template 402 contains no input content to be displayed by the inferior templates 414 through the hierarchical relationship 410.

The homepage template 404 provided in the custom design application 400 is representative of a homepage web page that may be displayed in the user's customized website. The homepage template 404 may be customized with content provided by user input. In one embodiment, the site master template 402 is superior to the homepage template 404 in the hierarchical relationship 410 which will cause the homepage template 404 to display content provided to the site master template 402 via the global content effect. Generally, only one homepage template 404 is provided in the custom design application 400, however, the user may utilize multiple homepage templates if the user desires.

In certain embodiments, the homepage template 404 may also locally customized. Local customization allows the user to provide content to the homepage template 404 so that the content will be displayed only on the homepage template 404 via user input. In these embodiments, content provided to the homepage template 404 will cause the homepage template 404 to display the content locally input without utilizing the site master template 402 and the hierarchical relationship 410. As will be discussed later, localized content input may also be adapted to adhere to a hierarchical relationship with regard to templates inferior in the hierarchy to the template where the localized content input is provided.

The 404 error template 408 provided in the custom design application 400 is representative of a 404 error web page that may be displayed in the user's customized website. A 404 error web page is generally displayed when a user attempts to access a web page but the web page does not exist or the web page address, or URL has been incorrectly provided by a viewer of the user's website. For example, an individual searching for a web page on a user's website may incorrectly type the URL which would cause a 404 error web page to be displayed. In one embodiment, the 404 error template 408 may be customized with input provided by the user. Content may be provided to the 404 error template 408 by the global content affect via the site master template 404 or may be provided by localized customization. The 404 error page 408 is only inferior to the site master template 404 in the hierarchy of the plurality of templates 412. Therefore, the 404 error template may only be customized by localized content input or by the global content effect when the hierarchical relationship 410 causes the 404 error template 408 to display content provided via user input to the site master template 404.

The sub-templates 406 provided in the custom design application 400 are representative of one or more web pages that may be displayed in the user's customized website. The sub-templates 406 may be immediately inferior in the hierarchy to the site master template 402, the homepage template 404, other sub-templates 406, or combinations thereof. In one embodiment, the sub-templates 406 may be provided in a cascading hierarchy to other sub-templates 406. In this embodiment, a potentially infinite number of sub-templates 406 are provided wherein each subsequent sub-template provided in the cascading hierarchy is inferior to the immediately preceding sub-template. Similar to the homepage template 404 and the 404 error template 408, the sub-templates 406 may be customized by local content input provided by the user. The sub-templates 406 may also be customized by the global content effect as described in detail above. In the embodiment providing for a cascading hierarchy of sub-templates 406, each sub-template in the cascading hierarchy will display a content input provided to the site master template 404 via the global content effect by adhering to the hierarchical relationship 410.

Figure 4B:
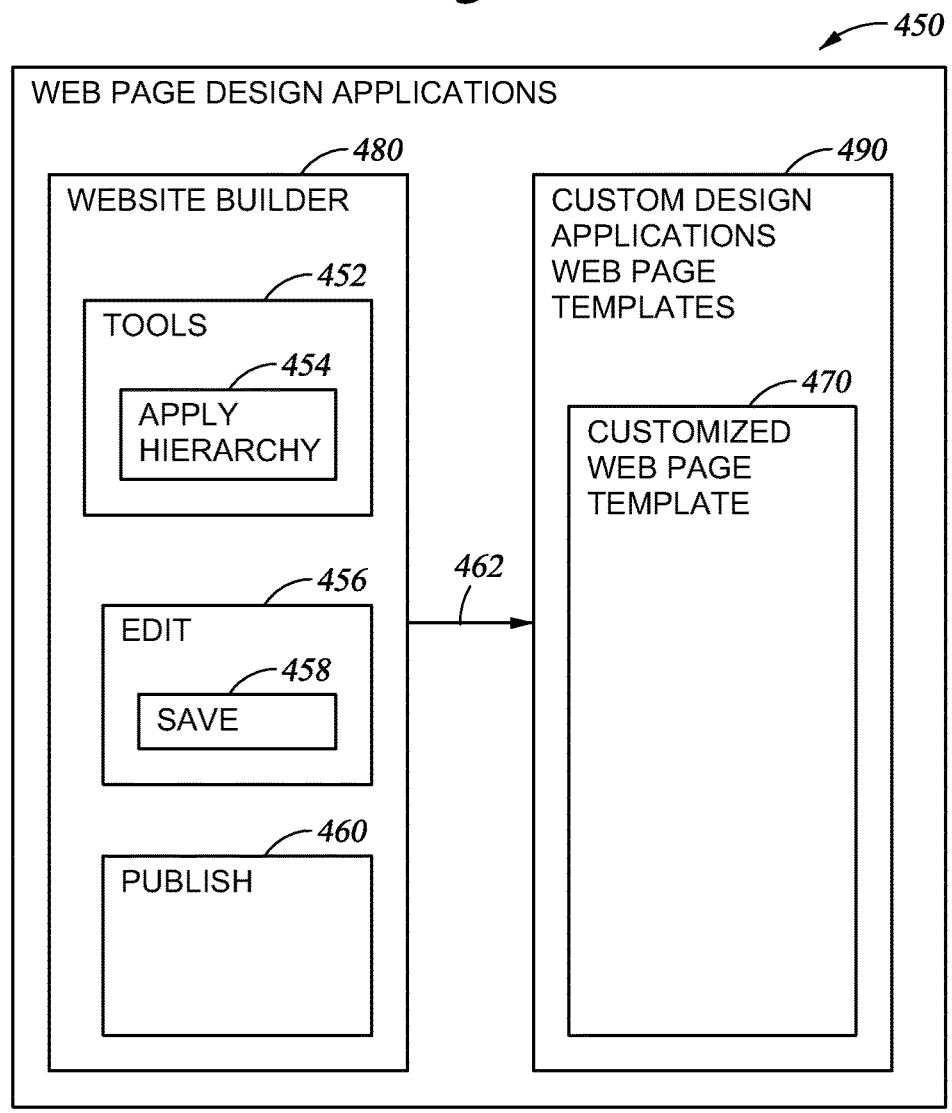
FIG. 4B illustrates custom web page template design applications and an exemplary input process of building a customizable website according to certain embodiments described herein.

FIG. 4B illustrates custom web page template design applications and an exemplary input process of building a customizable website according to certain embodiments. The web page design applications 450 depicted in FIG. 4B provide a website builder 480 and custom design web page templates 490, such as the site master template 404, sub-templates 406, and 404 error template 408 shown in FIG. 4A. The customized web page template 470 is representative of the templates provided in FIG. 4A and discussed above. The website builder 480 generally provides the user with tools 452 and other applications, such as an edit application 456 and publish application 460, that allow the user to create a custom designed website.

The website builder 480 further provides a plurality of applications to enable the user to design the website, such as an edit application 456 and a publish application 460. If the user desires to change or alter the design of the web page templates 490, the user may provide input selecting the edit application 456. The edit application 456 allows the user to customize the website design with the website builder 480 in any manner desired. Changes made to the website design by the user while editing the website may be saved automatically to the website design server 112 or may be saved to the website design server 112 with input provided by the user selecting the save application 458. In either case, the changes made during editing are not visible to viewers of the website until the user provides input to the publish application 460.

Alterations or changes to the user's website are saved on the website design server 112 without being visible to viewers, which allows the user to customize the website design and publish the final website design without requiring the website to be "down," and thus inaccessible to viewers, during construction of the website. The publish application 460 transmits the final customized website design from the user computer 104 through the communications network 102 to the website design server 112 where the user's website may be searched and accessed through the Internet.

The plurality of tools 452 provided by the website builder 480 allow the user to alter the web page templates 490. An apply hierarchy tool 454 allows the user to create and determine the hierarchical relationship 410 between the custom design application web page templates 490. In one embodiment, the apply hierarchy application 454 is automatically applied to the site master template 402 which causes inferior templates in the hierarchy to display content input provided by the user to the site master template 402. In another embodiment, the apply hierarchy application 454 may be selected by the user to determine the hierarchical relationship 410 between multiple sub-templates 406. Determining the hierarchical relationship 410 between multiple sub-templates 406 is especially useful when the user provides a local content input which the user desires to be displayed on a template inferior to the sub-template where the input was provided in the hierarchy of sub-templates 406 as determined by the apply hierarchy application 454. The apply hierarchy application 454 may also be applied to multiple sub-templates 406 to create a cascading hierarchy among the sub-templates 406.

A customized web page template 470 selected by the user from the custom design application web page templates 490 is generally configured to receive content from inputs or selections provided by the user. In one embodiment, the customized web page template 470 may be configured in any manner desired by the user. The user may generally utilize the website builder 480 and the plurality of tools 452 contained therein to customize the customized web page template 470.

Examples of content, such as content widgets and the like, that may be provided by the user to customize the user's website design may include, but is not limited to, picture or photograph applications, video applications, slide show applications, site visit counting applications, site search applications, maps and location applications, social media applications such as Facebook, Twitter, Tumblr, Yelp, and Groupon, and other applications which may contain content to be displayed on the user's website. In certain embodiments, the content may be applications created by the host of the website design server 112, the content may be applications created by a third party, or the content may be applications created by the user.

In one embodiment, the customized web page template 470 may comprise an organic layout function. An organic layout function defines a layout design configured to retain a plurality of preset proportions by continually adjusting content embedded within the customized web page template 470 to conform with the plurality of preset proportions. The organic layout function is an algorithm provided by a website design application host which may be applied to the user's website in order to ensure functionality and a desirable aesthetic appearance of the website. The organic layout function may apply to specific content within the customized web page template 470 or the entire contents of the website. Although the user has complete control over the content included in the website design, the organic layout function applies when the customized website design is published to improve the overall functionality and aesthetic value of the website design. The overall purpose of the of organic layout function is to provide a more cerebral, or "human," website layout and structure that increases intuitiveness of the website design from a user's perspective and ultimately leads to increased aesthetic quality and ease of use.

Figure 5:
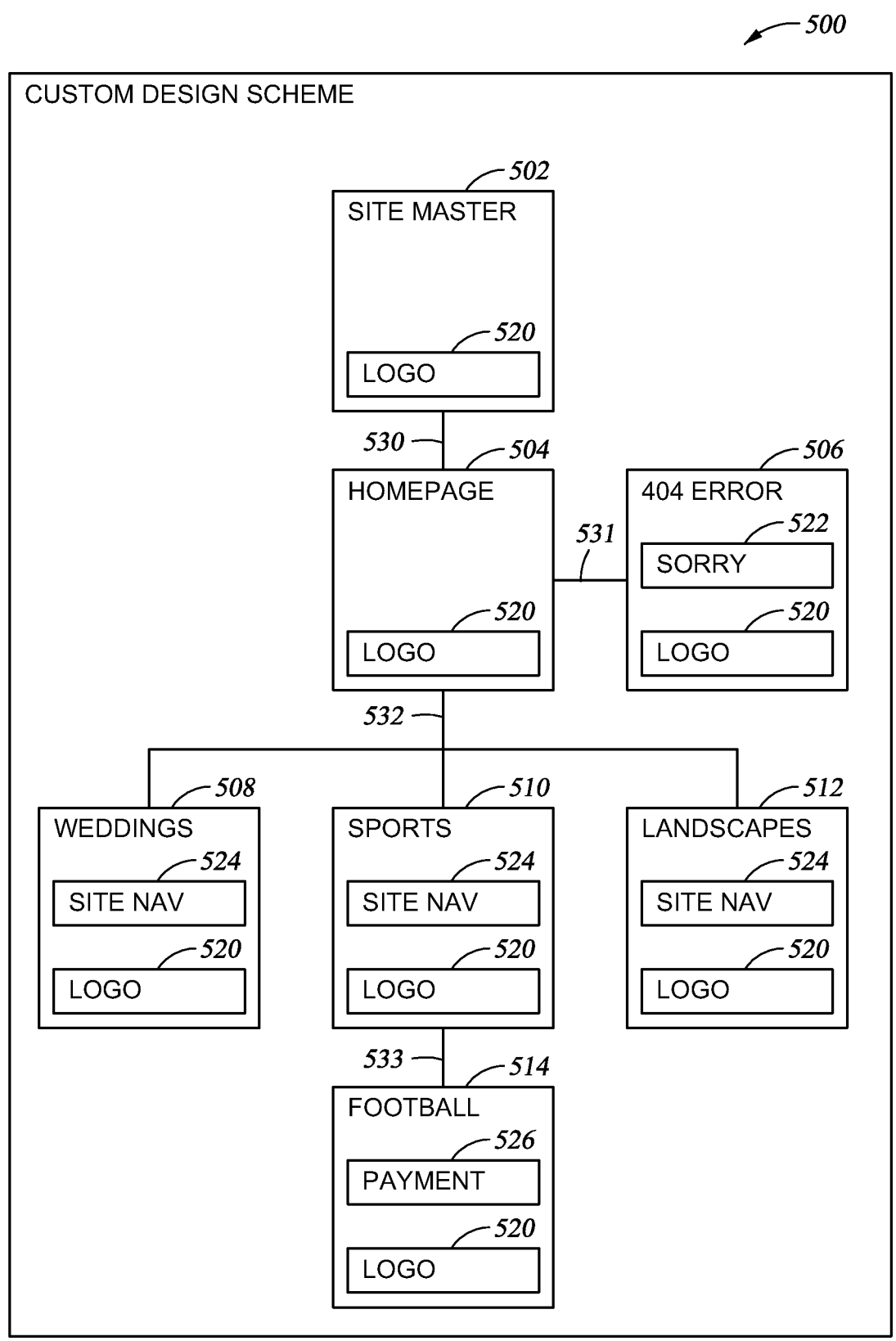
FIG. 5 illustrates a custom website design scheme according to certain embodiments described herein.

FIG. 5 illustrates a custom website design scheme according to certain embodiments. The custom design scheme 500 is provided as an example of how a website may be designed using the methods provided herein and is not intended to be limiting. The custom design scheme 500 generally depicts the interrelations between templates utilized in a user's custom website design, however, many other designs using the methods provided are possible. In one embodiment, the custom design scheme 500 provides a site master template 502, a homepage template 504, a 404 error template 506, and a plurality of sub-templates 508, 510, 512, and 514. In the example shown, and to provide context, the user's custom website may be designed for use as a commercial website, such as a photography website. An exemplary user of the embodiment depicted may be a professional photographer whose clients view and purchase photographs through the photographer's website. The site master template 502, homepage template 504, and 404 error template 506 have been generally described above with reference to FIG. 4A. In the embodiment shown, the plurality of sub-templates comprises three first tier sub-templates, such as a weddings template 508, a sports template 510, and a landscapes template 512. A second tier sub-template, such as a football template 514, is provided as another example of a sub-template that may be provided in the custom design scheme 500.

In one embodiment, a user may provide an input providing content to the site master template 502. In the example shown, the content provided to the website by the user input is a logo 520. A logo may generally comprise a design, mark, or other distinctive feature the user desires to be displayed on the user's website. As described above, content provided to the site master template 502 provides a global content effect, whereby the content provided to the site master template 502 will be displayed on every template inferior to the site master template 502 in the hierarchy. In the example shown, the global content effect provides the logo 520 to every inferior template: the homepage template 504, the 404 error template 506, the first tier sub-templates 508, 510, and 512, and the second tier sub-template 514. The global content effect adheres to the hierarchical relationship between the templates in the custom design scheme 500. As shown, the hierarchical relationship is depicted by reference numerals 530, 532, and 533 which represent a decreasing order of template superiority in the hierarchical relationship.

The homepage template 504 is inferior to the site master template 502 and displays the logo 520 as a result of the global content effect provided by the hierarchical relationship 530 to the site master template 502. The homepage template 504 may also be locally customized with other content desired by the user which may be displayed only on the homepage template 504. The 404 error template 506 is inferior to the site master template 502 and displays the logo 520 as a result of the global content effect provided by the hierarchical relationship 531 to the home page template 504 and the hierarchical relationship 530 to the site master template 502. In one embodiment, the 404 error template 506 may be locally customized. In the example shown, an error message 522 may be provided with input by the user to locally customize the 404 error template 506.

In one embodiment, first tier sub-templates 508, 510, and 512 are sub-templates which are inferior to the site master template 502. As an example in the context of a photography website, the first tier sub-templates 508, 510, and 512 provided are different types of photography events or subjects. The weddings template 508, sports template 510, and landscapes template 512 are inferior to the site master template 502 and display the logo 520 as a result of the global content effect provided by the hierarchical relationship 532 to the home page template 504 and the hierarchical relationship 530 to the site master template 502. In one embodiment, the first tier sub-templates 508, 510, and 512 may also be locally customized. In the example shown, website navigation content 524, such as a navigation content widget for directing the website viewer through multiple web pages within the website, may be provided with input by the user to locally customize the first tier sub-templates 508, 510, and 512. In another embodiment, a separate first tier sub-template may be provided wherein the user may provide input to locally customize the template which may then be utilized as the template for each of the first tier sub-templates 508, 510, and 512 in the custom design scheme 500.

In one embodiment, a second tier sub-template 514 is a sub-template which is inferior to the site master template 502. As an example in the context of a photography website, the second tier sub-template 514 provided is a football template 514 which is a more specific type of content related to the first tier sub-template sports 510. The football template 514 is inferior to the site master template 502 and displays the logo 520 as a result of the global content effect provided by the hierarchical relationship 533 to the first tier sub-template sports 510, the hierarchical relationship 532 to the home page template 504, and the hierarchical relationship 530 to the site master template 502. In one embodiment, the second tier sub-template 514 may also be locally customized. In the example shown, payment content 526, such as a payment receipt content widget for accepting payment if a viewer desires to buy a photograph from the user's website, may be provided with input by the user to locally customize the second tier sub-template football 514.

Figure 6:
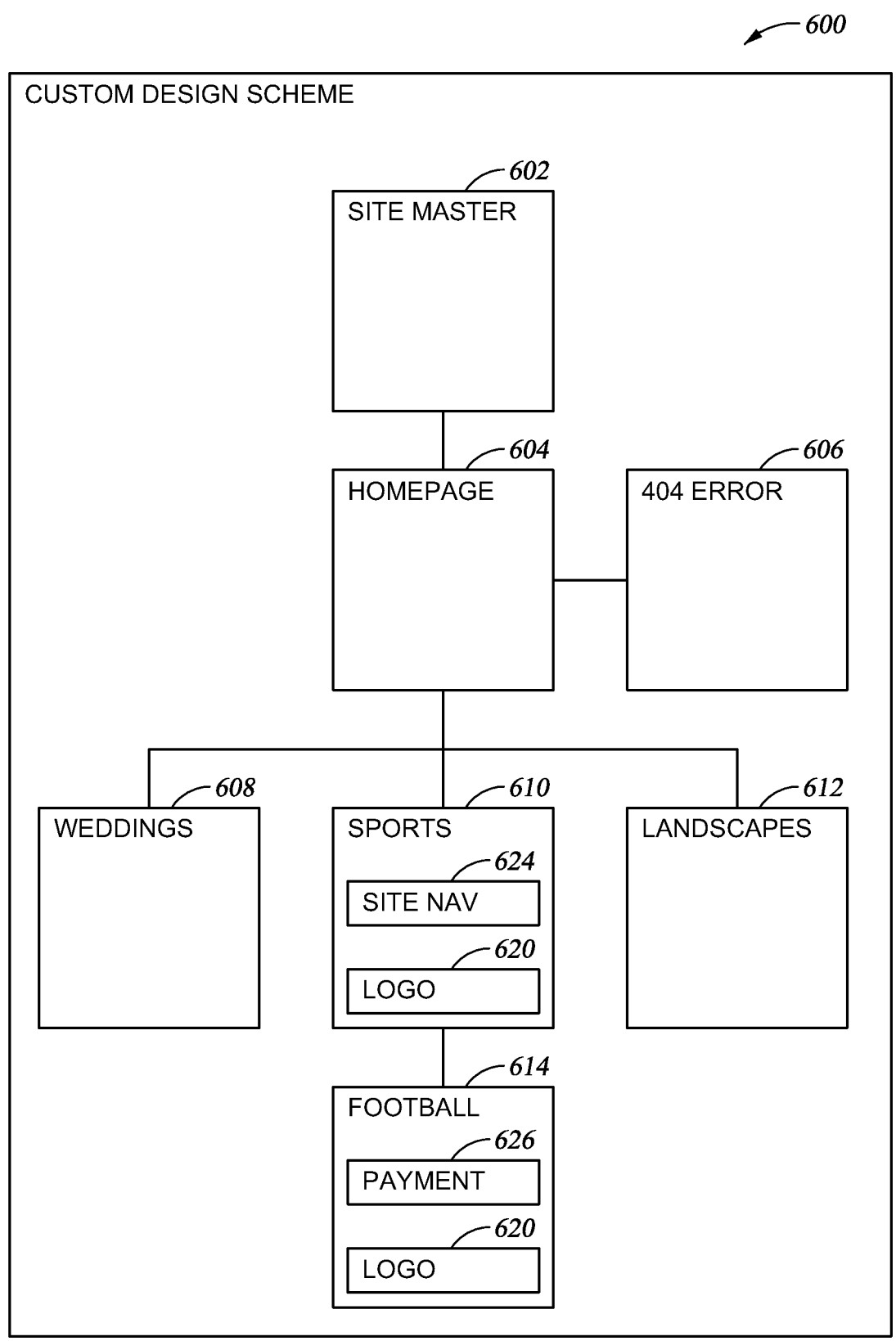
FIG. 6 illustrates a custom website design scheme according to certain embodiments described herein.

FIG. 6 illustrates a custom website design scheme according to certain embodiments. In one embodiment, the custom design scheme 600 provides a site master template 602, a homepage template 604, a 404 error template 606, and a plurality of sub-templates 608, 610, 612, and 614. In the example shown, and to provide context, the user's custom website may be designed for use as a commercial website, such as a photography website. The site master template 602, homepage template 604, and 404 error template 606 have been generally described above with reference to FIG. 4A. In the embodiment shown, the plurality of sub-templates comprises three first tier sub-templates, such as a weddings template 608, a sports template 610, and a landscapes template 612. A second tier sub-template, such as a football template 614, is provided as another example of a sub-template that may be provided in the custom design scheme 600.

In the example shown, no user input providing content to the site master template 602 is provided. Thus, in this example, no global content effect will be displayed throughout every web page within the website design. However, the embodiment shown does provide content, such as content provided with input provided by the user, to a first tier sub-template and a second tier sub-template. In one embodiment, content, such as a logo 620, is provided to the first tier sub-template sports 610. The logo 620 provided is an example of a localized content input. Similar to the logo 620, website navigation content 624, such as a navigation content widget, is provided as a local customization to the first tier sub-template sports 610. As discussed above, localized content inputs will only be displayed on the template where the input is provided by the user.

In another embodiment, the user may desire for a localized content input to be displayed on a template inferior to the template where the localized content is provided. In such a situation, the user may utilize a tool, such as an apply hierarchy tool 454 (See FIG. 4B) which will cause a localized input provided to a superior template to be displayed on templates inferior to the superior template where the localized input was provided. As shown in FIG. 6, localized input providing a logo 620 to the first tier sub-template sports 610 may be provided to the second tier sub-template football 614 by utilizing the apply hierarchy tool 454 which causes inferior templates to display content provided to a superior template in the hierarchy. However, the apply hierarchy tool 454 will not cause a superior template to display content provided to an inferior template.

In another embodiment, the second tier sub-template may be customized with only localized content input. In this embodiment, both the logo 620 and payment content 626, such as a payment receipt content widget, may be provided by localized content input. As such, no content would be displayed as a function of adhering to a hierarchical relationship between templates.

Figure 7:
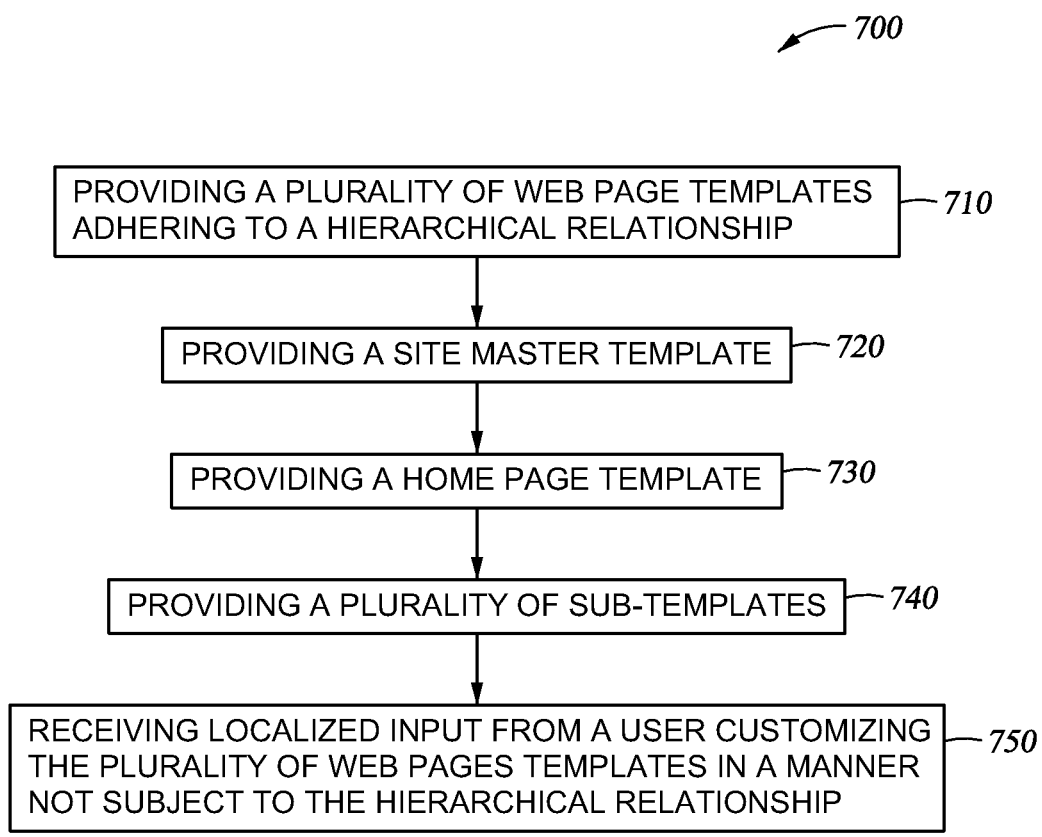
FIG. 7 illustrates a flow diagram of a method for designing a customizable website, according to certain embodiments described herein.

FIG. 7 illustrates a flow diagram of method steps for designing a customizable website according to certain embodiments. The method 700 of designing a customizable website begins at operation 710 by providing a plurality of web page templates adhering to a hierarchical relationship. A user may provide input to determine the hierarchical relationship between the plurality of web page templates. Next, at operation 720, a site master template is provided. The site master template is customizable with input received from the user and the site master template is the most superior web page template in the hierarchical relationship. Thus, as described in detail above, an input provided to the site master template will be reflected on every template inferior to the site master template as a result of the global content effect.

Operation 730 provides a homepage template. The homepage template is customizable with input received from the user and is inferior to the site master template in the hierarchical relationship. Next, at operation 740, a plurality of sub-templates are provided. The plurality of sub-templates are customizable with input received from the user and the plurality of sub-templates are inferior to the site master template in the hierarchical relationship. Finally, operation 750 provides for receiving localized input from a user customizing the plurality of web page templates in a manner not subject to the hierarchical relationship. The user may provide a local content effect which will only be displayed on the template locally customized, such as described in detail above. In sum, the method 700 of designing a customizable website allows the user to customize the plurality of templates. The method 700 also provides a manner of customizing a website by utilizing a hierarchical relationship between the templates in order to easily and efficiently custom design a website.

The embodiments described herein provide a user the ability to infinitely customize the user's website design. The templates provided may be customized with input provided by a user. The methods also provide a manner of customizing a website by utilizing a hierarchical relationship between the templates in order to easily and efficiently custom design a website. Utilizing a combination of localized and globalized content input and display characteristics, the website design methods ultimately provide the user the ability to easily and efficiently design a website that will display a unified design across every web page within the user's website while allowing each individual web page to be individually customized.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method of designing customizable websites, sequentially comprising:
   receiving user-customized content from a user device, the user-customized content provided for one or more of a plurality of web page templates associated with a customizable website, wherein the web page templates are provided by a host server;
   receiving user input to publish the customizable website after receipt of the user-customized content; and
   applying a layout function provided by the host server to the user-customized content following receipt of the user input to publish the customizable website, wherein the layout function retains a plurality of predetermined proportions by adjusting dimensions of the user-customized content embedded within the web page templates independent of customization by a user of the user device.

2. The method of claim 1, further comprising receiving hierarchical input from the user device regarding one or more hierarchical relationships between the plurality of web page templates, wherein customization of the web page templates is further based on the hierarchical relationships.

3. The method of claim 2, wherein the hierarchical relationships specify that customization of a superior web page template is applied to an inferior web page template in adherence to a global content effect of the hierarchical relationships.

4. The method of claim 3, wherein the web page templates include at least one of:
   a site master template, wherein the hierarchical relationships specify that the site master template is a most superior web page template among the web page templates;
   a homepage template, wherein the hierarchical relationships specify that the homepage template is inferior to the site master template; and
   one or more sub-templates.

5. The method of claim 4, wherein the user-customized content is provided for the site master template, and further comprising applying the user-customized content to one or more web page templates that are inferior to the site master template in adherence to the global content effect of the hierarchical relationships.

6. The method of claim 4, wherein the hierarchical relationships further include a cascading hierarchy of the sub-templates, and wherein the cascading hierarchy specifies that at least one of the sub-templates is inferior to another one of the sub-templates.

7. The method of claim 6, wherein the user-customized content is provided for the at least one sub-template, and further comprising applying the user-customized content to the other sub-template in adherence to the global content effect of the hierarchical relationship.

8. The method of claim 1, wherein the layout function is applicable to specifically adjust the user-customized content.

9. The method of claim 1, wherein the layout function is applicable to adjust an entirety of the customizable website.

10. The method of claim 1, further comprising transferring the customizable website from the host server to a content storage unit where the customizable website is accessible by the user device.

11. A computer system of designing customizable websites, the system comprising:
    a communication interface that communicates over a communication network, wherein the communication interface:
        receives user-customized content from a user device, the user-customized content provided for one or more of a plurality of web page templates associated with a customizable website, wherein the web page templates are provided by a host server; and
        receives user input to publish the customizable website after receipt of the user-customized content; and
    a processor that executes instructions stored in memory, wherein the processor executes the instructions to apply a layout function provided by the host server to the user customized content following receipt of the user input to publish the customizable website, wherein the layout function retains a plurality of predetermined proportions by adjusting dimensions of the user-customized content embedded within the web page templates independent of customization by a user of the user device.

12. The system of claim 11, wherein the communication interface further receives hierarchical input from the user device regarding one or more hierarchical relationships between the plurality of web page templates, wherein customization of the web page templates is further based on the hierarchical relationships.

13. The system of claim 12, wherein the hierarchical relationships specify that customization of a superior web page template is applied to an inferior web page template in adherence to a global content effect of the hierarchical relationships.

14. The system of claim 13, wherein the web page templates include at least one of:
    a site master template, wherein the hierarchical relationships specify that the site master template is a most superior web page template among the web page templates;
    a homepage template, wherein the hierarchical relationships specify that the homepage template is inferior to the site master template; and
    one or more sub-templates.

15. The system of claim 14, wherein the user-customized content is provided for the site master template, and wherein the processor executes further instructions to apply the user-customized content to one or more web page templates that are inferior to the site master template in adherence to the global content effect of the hierarchical relationships.

16. The system of claim 14, wherein the hierarchical relationships further include a cascading hierarchy of the sub-templates, and wherein the cascading hierarchy specifies that at least one of the sub-templates is inferior to another one of the sub-templates.

17. The system of claim 14, wherein the user-customized content is provided for the at least one sub-template, and wherein the processor executes further instructions to apply the user-customized content to the other sub-template in adherence to the global content effect of the hierarchical relationship.

18. The system of claim 14, wherein the layout function is applicable to specifically adjust the user-customized content or to adjust an entirety of the customizable website.

19. The system of claim 18, wherein the layout function is applicable to adjust an entirety of the customizable website.

20. The system of claim 11, wherein the communication interface further transfers the customizable website from the host server to a content storage unit where the customizable website is accessible by the user device.

21. A non-transitory computer readable storage medium having embodied thereon a program, wherein the program is executable by a processor to perform a method of designing customizable websites, the method comprising:
  receiving user-customized content from a user device, the user-customized content provided for one or more of a plurality of web page templates associated with a customizable website, wherein the web page templates are provided by a host server;
  receiving user input to publish the customizable website after receipt of the user-customized content; and
  applying a layout function provided by the host server to the user-customized content following receipt of the user input to publish the customizable website, wherein the layout function retains a plurality of predetermined proportions by adjusting dimensions of the user-customized content embedded within the web page templates independent of customization by a user of the user device.

* * * * *